April 2, 1963   A. J. WEINSTEIN   3,083,826
PACKAGE FOR FILTER HOLDER AND THE LIKE
Filed June 9, 1960   2 Sheets-Sheet 1
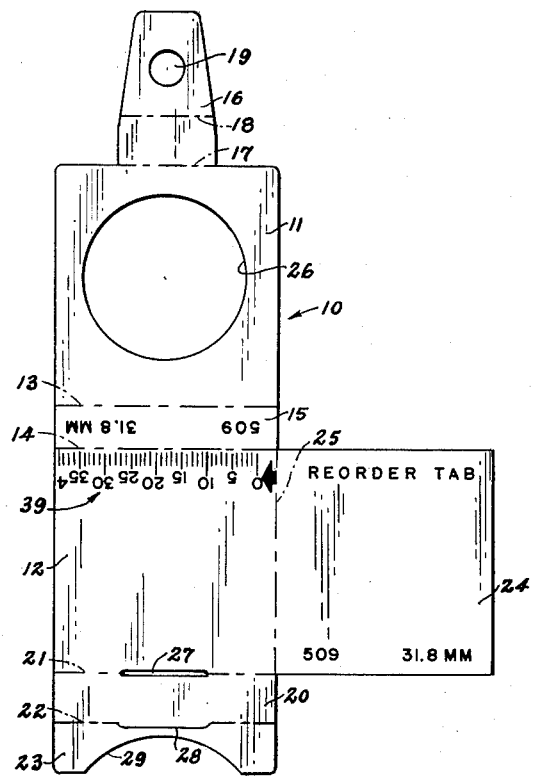
Fig.1.
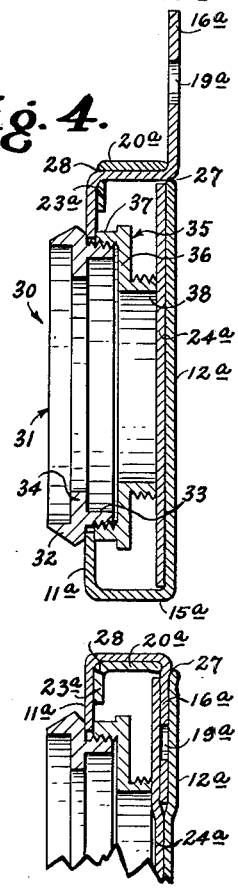
Fig.4.
Fig.5.
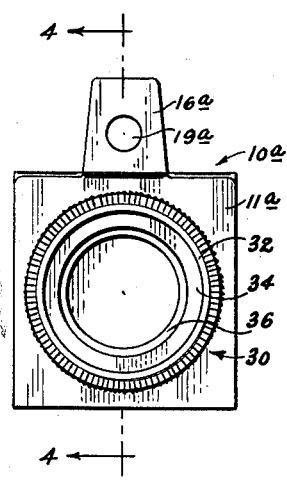
Fig.2.
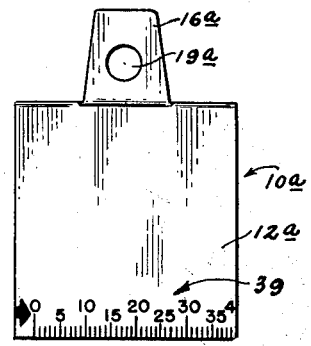
Fig.3.
INVENTOR.
ALEX J. WEINSTEIN
BY
ATTORNEY

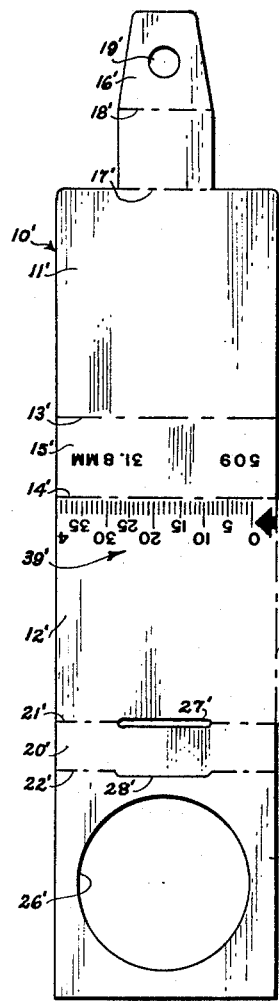
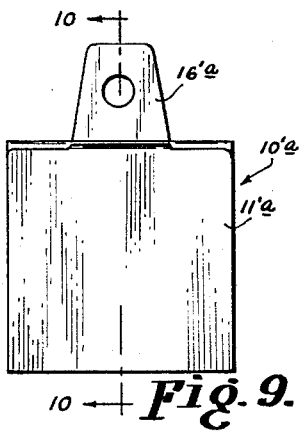
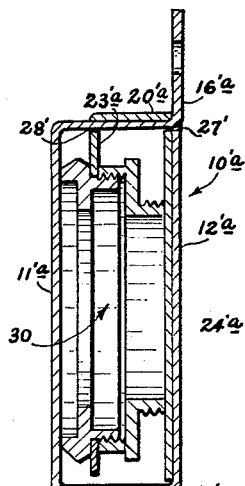
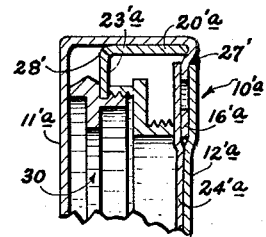
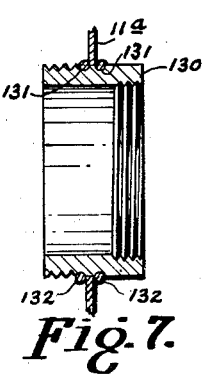
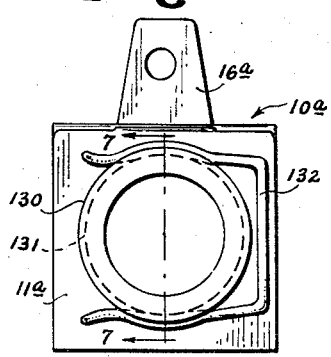

United States Patent Office 3,083,826
Patented Apr. 2, 1963

3,083,826
PACKAGE FOR FILTER HOLDER AND THE LIKE
Alex J. Weinstein, Mount Vernon, N.Y., assignor to The Ednalite Corporation, Westchester, N.Y., a corporation of New York
Filed June 9, 1960, Ser. No. 35,056
4 Claims. (Cl. 206—79)

This invention relates generally to the packaging of articles, such as photographic camera elements, more particularly, filter holders and other substantially cylindrical elements.

Filter holders and the like are usually sold separately from the photographic cameras with which they are to be used. Such filter holders are removably secured to the lens barrel or holder of the camera, for example, by a threaded connection. However, the great variety of existing cameras of different manufacture require filter holders of different sizes, so that a retail camera shop must stock a large number of filter holders of different sizes in order to accommodate the needs of its customers. The usual package for a filter holder has consisted of a conventional box containing the filter holder and having suitable indicia on its exterior surface identifying the size of the filter holder contained therein. When a customer appears in a camera shop and requests a filter holder for his particular camera, it has been the usual practice for the sales person to consult a chart or table showing the size of the filter holder needed for that camera, and to select the package containing such filter holder from the stock or supply thereof. However, such charts or tables are frequently made obsolete by the increasing numbers of cameras being produced, and by the numerous imports from foreign countries which may not be listed. In that case, the sales person has to estimate roughly the size of the required filter holder, and to successively try out a number of the filter holders until the one that fits the lens barrel of the camera has been selected. With this trial and error method, it is necessary to remove each filter holder from its box or container in order to apply the filter holder to the camera in question so that, by the time the correct filter holder has been located and a sale has been consummated, the sales counter is frequently cluttered with a number of filter holders separate from the boxes or containers therefor, and it then becomes necessary for the sales person to return the filter holders to the correct boxes in order to ensure that the stock or inventory will not become confused.

Accordingly, it is an object of the present invention to provide an improved package for filter holders and the like which facilitates the selection of the particular filter holder required to fit a camera, and which permits the experimental fitting of the filter holders to a camera without requiring the removal of the filter holders from the respective packages.

In accordance with an aspect of this invention, a package for a filter holder or the like includes at least a first wall having an opening therein to receive the filter holder and support the latter, a rear wall which is hingedly connected to the first wall at an edge thereof, and a releasable connection for holding the rear wall in a normal closed position where it extends parallel to and in back of the first wall for covering the back of a filter holder supported by the latter, for example, during storage or shipment, such releasable connection being conveniently disengageable to permit swinging of said rear wall so as to expose the back of the filter holder for experimental fitting on a particular camera while the filter holder remains mounted within the opening of the first wall of the package.

In one embodiment of the invention, the opening receiving the filter holder or the like is formed in the front wall of the package, whereas, in another embodiment of the invention, the opening receiving the filter holder or the like is formed in a wall intermediate the front and rear walls of the package so that both the front and back of the filter holder are covered in the closed condition of the package.

In accordance with another feature of the invention, one wall of the filter holder package, preferably the back wall thereof, has a suitably calibrated scale thereon by which the diameter of that portion of the lens holder of the camera intended to receive the filter holder may be conveniently measured, thereby to facilitate the selection of the required filter holder.

In accordance with still another feature of the invention, each filter holder package has an integral tab or flap which is conveniently separable from the remainder of the package and which bears indicia identifying the size and/or manufacturer's code number of the corresponding filter holder so that, when the latter is sold, such tab or flap can be detached from the package by the retailer and sent to the manufacturer or distributor as a convenient means of automatically reordering a filter holder of the same size as that which has been sold, thereby to ensure maintenance of a complete inventory of all of the different filter holders.

A further object of the invention is to provide a package for filter holders having the above advantageous characteristics, and which may be conveniently employed for display of the goods in question, thereby to stimulate sales thereof, or for the orderly storing of the many different sized filter holders in order to facilitate selection of the desired filter holder from the large stock thereof.

The above, and other objects, features and advantages of the invention, will be apparent in the following detailed description of an illustrative embodiment thereof which is to be read in connection with the accompanying drawings forming a part hereof, and wherein:

FIG. 1 is a plan view of a flat blank from which a package for a filter holder or the like is to be formed in accordance with one embodiment of the present invention;

FIG. 2 is a front elevational view of a package formed from the blank of FIG. 1 and containing a filter holder, with such package being shown in the condition thereof for visible display of the filter holder;

FIG. 3 is a back elevational view of the package of FIG. 2;

FIG. 4 is a vertical sectional view, on an enlarged scale, taken along the line 4—4 of FIG. 2;

FIG. 5 is a fragmentary sectional view corresponding to the upper portion of FIG. 4, but illustrating the alternative condition of the package for storage thereof in a drawer or the like;

FIG. 6 is a view similar to that of FIG. 2, but showing another optical element mounted in the package;

FIG. 7 is a fragmentary sectional view along the line 7—7 of FIG. 6;

FIG. 8 is a view similar to that of FIG. 1, but showing a blank from which a package is formed in accordance with another embodiment of the invention;

FIG. 9 is a front elevational view of a package formed from the blank of FIG. 8;

FIG. 10 is an enlarged sectional view taken along the line 10—10 of FIG. 9; and

FIG. 11 is a fragmentary sectional view corresponding to the upper portion of FIG. 10, but showing the alternative condition of the package for storage in a drawer or the like.

Referring to the drawings in detail, and initially to FIG. 1 thereof, it will be seen that a package for a filter holder or the like which embodies the present invention is formed of a one-piece blank 10 of stiff paper or cardboard having substantially square sections or panels 11 and 12 which are joined together, at scored fold lines 13 and 14, by a relatively narrow section 15. A tab section 16 is joined, along a scored fold line 17, to the edge of section 11 remote from section 15, and has a scored fold line 18 extending thereacross at a distance from fold line 17 which is substantially equal to the width of section 15. Further, tab section 16 has an opening 19 therein in the portion of tab section 16 between fold line 18 and the free end thereof.

Another relatively narrow section 20 is joined, by a scored fold line 21, to section 12 along the edge of the latter remote from the scored fold line 14, and a flap section 23 is, in turn, joined to section 20, by a scored fold line 22, along the edge of section 20 remote from section 12. A generally square tab section 24 having substantially the same dimensions as each of the sections 11 and 12, is joined to one of the side edges of section 12, that is, an edge of the latter extending at right angles to the scored fold lines 14 and 21, along a perforated, or partly cut fold line 25.

The blank 10 further has a relatively large circular opening 26 located centrally in section 11, an elongated slot 27 with a length substantially equal to the width of the tab section 16 at fold line 18 and being centrally located along fold line 21, and a slit 28 which is centrally located along fold line 22 and has a length substantially equal to the width of tab 16 at fold line 17 thereof. Finally, flap 23 of blank 10 has an arcuate cut-out 29 located centrally in its free longitudinal edge and having a radius of curvature substantially equal to the radius of opening 26, with the minimum distance from fold line 22 to the edge of arcuate cut-out 29 being no greater than the minimum distance from fold line 17 to the edge of circular opening 26.

Referring to FIG. 4, it will be seen that a filter holder that may be contained in the package embodying the present invention, and there generally identified by the reference numeral 30 is of two-piece construction. More specifically, filter holder 30 includes an annular part 31 having a forward, axially directed rim 32, a rearwardly directed cylindrical extension 33 which is externally threaded and has a smaller diameter than the rim 32 so as to define an external radial shoulder therebetween, and a radially inward directed flange 34 located between rim 32 and extension 33. Filter holder 30 further includes an annular part 35 having a radially directed, annular wall 36, an internally threaded, forwardly directed cylindrical extension 37 at the outer periphery of annular wall 36 for threaded engagement with the externally threaded extension 33 of annular part 31, and an externally threaded, rearwardly directed cylindrical extension 38 projecting from the inner periphery of annular wall 36 and adapted to be screwed into the lens holder of the camera on which filter holder 30 is intended to be fitted. Filter holder 30 is adapted to receive a filter between flange 34 of annular part 31 and annular wall 36 of part 35, and such filter may be removed and replaced by separating the annular parts 31 and 35 at the threaded connection therebetween provided by extensions 33 and 37.

The opening 26 in section 11 of blank 10 has a diameter that is at least as large as the external diameter of extention 33 of annular part 31 of the filter holder intended to be received in the package, but the diameter of opening 26 is smaller than the external diameter of extension 37 of part 35.

In employing the blank 10 to form a package 10a embodying the present invention for the filter holder 30, annular parts 31 and 35 of the filter holder are separated from each other, and extension 33 of annular part 31 is inserted rearwardly through opening 26, whereupon extension 37 of annular part 35 is screwed onto extension 33, as shown in FIG. 4, so that section 11 of blank 10 is gripped between the forward edge of extension 37 and the radial shoulder defined between rim 32 and extension 33 of annular part 31.

After filter holder 30 has been secured in opening 26, in the manner described above, section 15 of the blank is bent rearwardly along fold line 13 to form the bottom wall 15a of the package 10a, while section 11 forms the front wall 11a of the package supporting the filter holder. Then tab 24 is folded along fold line 25 to overlie section 12, and sections 12 and 24 are jointly folded upwardly about fold line 14, so that, as shown in FIG. 4, section 12 forms the rear wall 12a of the package, with tab 24 lying against the front surface of rear wall 12a, as at 24a, between filter holder 30 and the rear wall of the package. After section 20 is bent forwardly about fold line 21 to form the top wall 20a of the package, and flap 23 is bent downwardly about fold line 22 so as to lie in back of the upper portion of front wall 11a, as at 23a in FIG. 4, the tab section 16 of the blank can then be selectively manipulated in two different ways, as illustrated in FIGS. 4 and 5, respectively, in order to releasably secure the top of front wall 11a to the top of rear wall 12a.

When it is desired to employ the package 10a in a visible or counter-top display, tab section 16 of the blank is bent rearwardly along fold line 17 and extended through slit 28 and slot 27, prior to being bent upwardly along fold line 18, as shown in FIG. 4, so that the portion of tab section 16 between fold lines 17 and 18 underlies top wall 20a of the package, while the exposed portion of tab section 16 forms an upwardly extending hanger tab 16a with a hole 19a therein to receive a pin or peg by which the package 10a may be conveniently suspended on a display board or the like for convenient viewing by the purchaser or sales person.

During shipment, or when the package is to be stored in a drawer, box or the like, the tab section 16 of blank 10 may be manipulated in the manner illustrated in FIG. 5, that is, with the portion of the tab section between fold lines 17 and 18 being bent rearwardly and overlying top wall 20a, and with the remainder 16a of the tab section being bent downwardly and extending inwardly through slot 27 so as to project downwardly in front of rear wall 12a, for example, between tab 24a and rear wall 12a.

As shown in FIGS. 1 and 3, section 12 of blank 10 which forms rear wall 12a of the package is preferably provided with a scale 39 which is suitably calibrated, for example, in millimeters, and which extends along fold line 14 so as to appear at the bottom edge of the rear wall of the package, as in FIG. 3. Further, section 15 of blank 10 and tab 24 of the blank are both preferably imprinted with indicia identifing the model number and size of the filter holder assembled or contained in the package 10a.

It will be apparent that rear wall 12a of the package is held in back of the filter holder 31 merely by the selective engagement of tab section 16 either in slit 28 and slot 27, as in FIG. 4, or only in slot 27, as in FIG. 5, so that the removal of the tab section from the slit and slot, or from the slot alone, as the case may be, releases the upper end of rear wall 12a from front wall 11a, and permits downward pivoting of the rear wall to a depending position so as to expose the back of a filter holder 30. Thus, when a person desirous of purchasing a filter holder to fit a particular camera presents such camera to the retailer, the latter merely measures the diameter of the lens holder of the camera on the scale 39 of a package 10a, and selects that package bearing indicia identifying a filter holder of the measured diameter. Then the tab 16a of the package is released to permit downward pivoting of the rear wall 12a thereof and the exposed external threads of the rearward extension 38 of the filter holder can be tried in the corresponding threads of the lens holder without separating the filter holder from its package. If several filter holders need to be tried on the camera before selecting that filter holder which is intended for use with the camera, there is no danger that the individual filter holders will become separated from their related packages, and the stock or inventory is always maintained in an orderly fashion. When a filter holder is sold, the retailer detaches the tab 24a from the remainder of package 10a, and such tab is mailed to the manufacturer or distributor, thereby to provide a convenient means for reordering a filter holder of the size which has been sold, for ensuring the maintenance of a complete inventory of filter holders of all of the different sizes.

Although the previous description of the package 10a has specifically referred to a filter holder 30 as being supported in the opening 26 of front wall 11a, it is to be understood that other generally cylindrical camera or other elements may be supported in that opening of the package. Thus, as shown in FIGS. 6 and 7, a one-piece cylindrical element 130 may also be supported within opening 26 of front wall 11a by providing the external surface of element 130 with a pair of axially spaced apart, circumferential grooves 131 which are adapted to receive spring clips 132 after cylindrical element 130 has been inserted in the opening of front wall 11a so that the latter lies between the spring clips 132 which thereby prevent axial removal of element 130 from the opening of front wall 11a.

Although the previously described package 10a has the opening 26 in which the filter holder 30 or the like is supported formed in the front wall 11a of the package so that the front of the filter holder is exposed even when the package is in its closed condition, it is to be understood that a package embodying the present invention may be provided with front and back walls covering the filter holder or other element contained in the package when the latter is in its closed condition. More particularly, a package embodying this invention may be formed from a one-piece blank 10' (FIG. 8) which is generally similar to the blank 10 of FIG. 1 and has its various sections and fold lines identified by the corresponding reference numerals, but with a prime attached to each numeral. The blank 10' of FIG. 8 differs from the blank 10 in that the section or panel 11' which is intended to form the front wall of the package does not contain a circular opening for receiving the packaged article, and such opening 26' is formed instead in a substantially square section or panel 23' which replaces the flap section 23, and thus is joined to the section 20' along the fold line 22'. The blank 10' further differs from the blank 10 in that the distance between fold lines 13' and 14' defining the margins of section 15', as well as the distance between fold lines 17' and 18' extending across tab section 16', is larger than the distance between fold lines 21' and 22' defining the margins of section 20', and preferably is substantially equal to the overall axial length of the article to be contained in the package.

In forming the package 10'a (FIGS. 9 and 10) from the blank 10', the article to be contained in the package, for example, the previously described filter holder 30, is first installed in the opening 26' of section 23' so as to be supported by the latter. The section 20' is then bent rearwardly along fold line 22' to form the top wall 20'a of the package, and the section 12' is then bent downwardly along fold line 21' so as to form the rear wall 12'a with the section 24' being bent inwardly, about fold line 25' so as to be interposed between the back of filter holder 30 and the rear wall of the package. Thereafter, section 15' is bent forwardly along fold line 14' to form the bottom wall 15'a, and section 11' is bent upwardly about fold line 13' to form the front wall 11'a of the package lying in front of filter holder 30. Finally, section 16' is bent rearwardly about fold line 17' and, as shown in FIG. 10, may be passed successively through slit 28' and slot 27' before being bent upwardly, about fold line 18', so as to form a suspension tab 16'a. Alternatively, as shown in FIG. 11, the section 16' of blank 10' may be bent rearwardly about fold line 17' to overlie top wall 20'a and section 16' is then bent downwardly, about fold line 18' and passed inwardly through slot 27' so as to lie in front of rear wall 12'a.

In either case, it will be apparent that section 16' of the blank cooperates with slit 28' and slot 27' (FIG. 10) or with slot 27' alone (FIG. 11) in order to hold the package in its closed condition, as illustrated in FIGS. 9, 10 and 11, wherein the article, for example, the filter holder 30, is disposed between the front wall 11'a and the rear wall 12'a and is supported within the opening 26' of an intermediate wall 23'a.

When section 16' of the blank is released from either both slot 27' and slit 28' or from slot 27' alone, the front and rear walls 11'a and 12'a can be successively unwrapped from around filter holder 30, thereby to expose the back of the latter for trial fitting on a camera or the like, without requiring the separation of such filter holder from the blank forming the package.

Although illustrative embodiments of the invention have been described in detail herein with reference to the accompanying drawings, it is to be understood that the present invention is not limited to those precise embodiments, and that various changes and modifications may be effected therein without departing from the scope or spirit of the invention, except as defined in the appended claims.

What is claimed is:

1. The combination of a filter holder including two annular parts having cylindrical extensions with cooperating external and internal threads for releasably securing said parts to each other; and a package for said filter holder comprising a first wall having a circular opening therein dimensioned to receive said extension with external threads so that, when said extension with internal threads is screwed on said external threads, said filter holder is retained in said opening, a rear wall substantially coextensive with said first wall, means hingedly connecting said first and rear walls to each other along one of their adjacent edges so that said rear wall can move between a normal position in back of said filter holder and an extended position exposing the back of said filter holder for trial fitting on a camera, releasable means operative to hold said rear wall in said normal position, and a reorder tab removably attached to said rear wall along a side edge of the latter and normally lying in front of said rear wall, said rear wall having a scale on the surface thereof normally facing away from said first wall and which is calibrated to measure the sides of a filter holder to be fitted on a camera.

2. The combination of a filter holder including two annular parts having cylindrical extensions with cooperating external and internal threads for releasably securing said parts to each other; and a package for said filter holder comprising a first wall having a circular opening therein dimensioned to receive said extension with external threads so that, when said extension with internal threads is screwed on said external threads, said filter holder is retained in said opening, a rear wall substantially coextensive with said first wall, means hingedly connecting said first and rear walls to each other along one of their adjacent edges so that said rear wall can move between a normal position in back of said filter holder and an extended position, releasable means operative to hold said rear wall in said normal position, and a reorder tab removably attached to said rear wall along a side edge of the latter and normally lying in front of said rear wall, said rear wall having a scale on the surface thereof normally facing away from said first wall and which is calibrated to measure the size of a filter holder to be fitted on a camera.

3. The combination of a filter holder including two annular parts having cylindrical extensions with cooperating external and internal threads for releasably securing said parts to each other; and a package for said filter holder comprising a first wall having a circular opening therein dimensioned to receive said extension with external threads so that, when said extension with internal threads is screwed on said external threads, said filter holder is retained in said opening, a rear wall substantially coextensive with said first wall, means hingedly connecting said first and rear walls to each other along one of their adjacent edges so that said rear wall can move between a normal position in back of said filter holder and an extended position, releasable means operative to hold said rear wall in said normal position, and a reorder tab removably attached to said rear wall along a side edge of the latter and normally lying in front of said rear wall.

4. The combination of a filter holder including two annular parts having cylindrical extensions with cooperating external and internal threads for releasably securing said parts to each other; and a package for said filter holder comprising a first wall having a circular opening therein dimensioned to receive said extension with external threads so that, when said extension with internal threads is screwed on said external threads, said filter holder is retained in said opening, a rear wall substantially coextensive with said first wall, means hingedly connecting said first and rear walls to each other along one of their adjacent edges so that said rear wall can move between a normal position in back of said first wall and an extended position, releasable means for holding said rear wall in said normal position, said rear wall having a scale on the surface thereof normally facing away from said first wall and which is calibrated to measure the size of a filter holder to be fitted on a camera, and a removable reorder tab normally positioned so as to be visible through said annular parts of the filter holder.

References Cited in the file of this patent

UNITED STATES PATENTS

| | | |
|---|---|---|
| 1,116,043 | Elliott | Nov. 3, 1914 |
| 1,848,859 | Wishart | Mar. 8, 1932 |
| 1,987,081 | Scott | Jan. 8, 1935 |
| 2,274,253 | Howell | Feb. 24, 1942 |
| 2,321,952 | Taylor | June 15, 1943 |
| 2,604,204 | Rockery et al. | July 22, 1952 |
| 2,611,481 | Sargeant et al. | Sept. 23, 1952 |
| 2,780,348 | Harter et al. | Feb. 5, 1957 |
| 2,850,160 | Siebel et al. | Sept. 2, 1958 |
| 2,878,061 | Saeks | Mar. 17, 1959 |

FOREIGN PATENTS

| | | |
|---|---|---|
| 371,651 | Germany | May 10, 1922 |